US010651881B2

(12) United States Patent
Houser et al.

(10) Patent No.: US 10,651,881 B2
(45) Date of Patent: *May 12, 2020

(54) LAUNCHABLE COMMUNICATIONS DEVICE FOR A DISTRIBUTED COMMUNICATION SYSTEM

(71) Applicants: Peter Bennett Houser, Poway, CA (US); Mary Anne Lorraine Domm, San Diego, CA (US); Charles Jackson Nesbitt, IV, San Diego, CA (US)

(72) Inventors: Peter Bennett Houser, Poway, CA (US); Mary Anne Lorraine Domm, San Diego, CA (US); Charles Jackson Nesbitt, IV, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,733

(22) Filed: Dec. 18, 2018

(65) Prior Publication Data

US 2019/0132017 A1   May 2, 2019

Related U.S. Application Data

(63) Continuation of application No. 14/565,056, filed on Dec. 9, 2014, now Pat. No. 10,200,073.

(51) Int. Cl.
*H04B 1/38* (2015.01)
*H04B 1/3888* (2015.01)

(52) U.S. Cl.
CPC ... *H04B 1/3888* (2013.01); *H04B 2001/3894* (2013.01)

(58) Field of Classification Search
USPC .................................................. 455/0.8–25
See application file for complete search history.

(56) References Cited

U.S. PATENT DOCUMENTS

| 4,884,769 A | 12/1989 | Snead |
| 8,503,941 B2 * | 8/2013 | Erdos ........... H01Q 3/00 455/430 |
| 8,897,770 B1 * | 11/2014 | Frolov ........... H04W 84/06 244/25 |

(Continued)

*Primary Examiner* — Edward F Urban
*Assistant Examiner* — Max Mathew
(74) *Attorney, Agent, or Firm* — Tarolli, Sundheim, Covell & Tummino LLP

(57) ABSTRACT

One example described herein includes a launchable communications device. The device includes an electronic payload comprising a communication system configured to receive a first communications signal and to transmit a second communications signal along a communications path between a first communication station and a second communication station. The device also includes deployment equipment configured to deploy the launchable communications device and to sustain a deployment state of the launchable communications device with respect to a predetermined operational environment. The device further includes a rigid housing configured to substantially enclose the electronic payload and the conveyance equipment prior to and during at least a portion of deployment of the launchable communications device to the predetermined operational environment.

17 Claims, 7 Drawing Sheets

(56) References Cited

U.S. PATENT DOCUMENTS

| | | | |
|---|---|---|---|
| 9,309,006 B2 | 4/2016 | Zwaan et al. | |
| 9,663,249 B2 | 5/2017 | Lively et al. | |
| 2010/0327119 A1* | 12/2010 | Horowitz | B64G 1/1007 244/173.1 |
| 2013/0193269 A1* | 8/2013 | Zwaan | B64D 9/00 244/118.1 |
| 2014/0042042 A1* | 2/2014 | DeVaul | B64B 1/40 206/216 |
| 2014/0060418 A1* | 3/2014 | Moody | B63G 8/14 114/331 |
| 2014/0105100 A1* | 4/2014 | Tronc | H04B 7/195 370/321 |
| 2014/0208927 A1* | 7/2014 | Cox | F41A 23/24 89/1.51 |
| 2014/0369260 A1* | 12/2014 | Conus | B64D 17/02 370/328 |
| 2015/0162974 A1* | 6/2015 | Trook | H04B 1/525 455/19 |
| 2015/0232205 A1* | 8/2015 | Lively | B64G 1/002 244/2 |
| 2016/0000061 A1* | 1/2016 | Boyd | A01M 31/002 340/539.32 |
| 2016/0280380 A1* | 9/2016 | Fourie | B64D 1/12 |
| 2017/0096208 A1* | 4/2017 | Klagenberg | B64B 1/62 |

* cited by examiner

LAUNCHABLE COMMUNICATIONS DEVICE FOR A DISTRIBUTED COMMUNICATION SYSTEM

RELATED APPLICATIONS

This application claims priority from U.S. patent application Ser. No. 14/565,056, filed 9 Dec. 2014, which is incorporated herein in its entirety.

TECHNICAL FIELD

This disclosure relates generally to communications systems, and specifically to a launchable communications device for a distributed communication system.

BACKGROUND

Communications between compatible radio devices may be precluded by geography, such that the distance between the radio devices may be too great or there may be intervening structures that interfere with a radio frequency (RF) line-of-sight transmission. Communications between radio devices may also be precluded by compatibility, such as based on incompatible communication protocols. When such situations occur, one or more intermediate communication stations may be used to instantiate the link between the two radios, bridging the geographic barrier and/or translating between incompatible protocols. As an example, intermediate communication stations can include fixed ground stations, fixed maritime locations, and/or aircraft. Such intermediate communication stations can often impose expenses and logistical complexities that limit or preclude their usage. For example, intermediate communication stations may be infeasible in a militarily contested area, as such intermediate communication stations are subject to cyber and kinetic attack, and the expense and logistical complexity of replacing destroyed devices can be excessive.

SUMMARY

One example described herein includes a launchable communications device. The device includes an electronic payload comprising a communication system configured to receive a first communications signal and to transmit a second communications signal along a communications path between a first communication station and a second communication station. The device also includes deployment equipment configured to deploy the launchable communications device and to sustain a deployment state of the launchable communications device with respect to a predetermined operational environment. The device further includes a rigid housing configured to substantially enclose the electronic payload and the conveyance equipment prior to and during at least a portion of deployment of the launchable communications device to the predetermined operational environment.

Another example described herein includes for providing a distributed communication system. The method includes launching at least one launchable communications device for deployment of the at least one launchable communications device in an operational environment. The at least one launchable communications device includes a communication system configured to receive a first communications signal and to transmit a second communications signal. The method also includes transmitting the first communications signal from a first communication station. The method further includes receiving and processing the second communications signal at a second communication station via the at least one launchable communications device.

Another example described herein includes a distributed communication system. The system includes a first communication station configured to at least one of transmit and receive a communications signal. The system also includes a second communication station configured to at least one of transmit and receive the communications signal. The system further includes a plurality of launchable communications devices. Each of the plurality of launchable communications devices includes an electronic payload comprising a communication system configured to transmit and receive the communications signal along a communications path between the first and second communication stations. Each of the plurality of launchable communications devices also includes deployment equipment configured to deploy the launchable communications device and to sustain a deployment state of the launchable communications device with respect to a predetermined operational environment. Each of the plurality of launchable communications devices includes further includes a rigid housing configured to substantially enclose the electronic payload and the conveyance equipment prior to and during at least a portion of deployment of the launchable communications device to the predetermined operational environment.

DETAILED DESCRIPTION

This disclosure relates generally to communications systems, and specifically to a launchable communications device for a distributed communication system. The distributed communication system can include a first communications station and a second communications station that can be communicatively coupled via at least one (e.g., a plurality of) launchable communications devices. The launchable communications devices can be arranged to have dimensions to facilitate launch from a tube launcher, such as from an aerial-vehicle. For example, the tube launcher can be a standard tube launcher that is configured to launch a dropsonde, a sonobuoy, chaff, flares, or a variety of other types of devices. Therefore, as an example, the launchable communications devices can be fabricated in a manner to be launched from existing tube launchers on aircraft, with the existing tube launchers being repurposed to launch the launchable communications devices.

As an example, the launchable communications devices can each include an electronic payload that can be implemented in either a point-to-point communications network or a mesh network between the first communication station and the second communication station. For example, each of the launchable communications devices can be configured to receive a communications signal and to retransmit the communications signal. In a point-to-point communications network configuration, each of the launchable communications devices can demodulate a received communications signal based on a first communication parameter (e.g., code, frequency, etc.) and can modulate the demodulated communication signal based on a second communication parameter (e.g., code, frequency, etc.) to retransmit the communications signal. In a mesh communications network configuration, each of the launchable communications devices can demodulate a received communications signal, amplify the received communications signal, and retransmit the amplified communications signal.

In addition, each of the launchable communications devices includes deployment equipment configured to maintain a deployment state of the respective launchable communications devices in a given predetermined operational environment. For example, each of the launchable communications devices can be launched for deployment to a given one operational environment, such as airborne (e.g., based on deploying an inflatable balloon), nautical (e.g., based on including a float), and terrestrial (e.g., based on deploying a stand or other structure to maintain upright positioning of an antenna). As another example, a given launchable communications device can include propulsion equipment, such that the launchable communications device can be configured as an unmanned vehicle. Thus, the launchable communications devices can cooperate with the first and second communication stations to form the distributed communication system.

Figure 1:
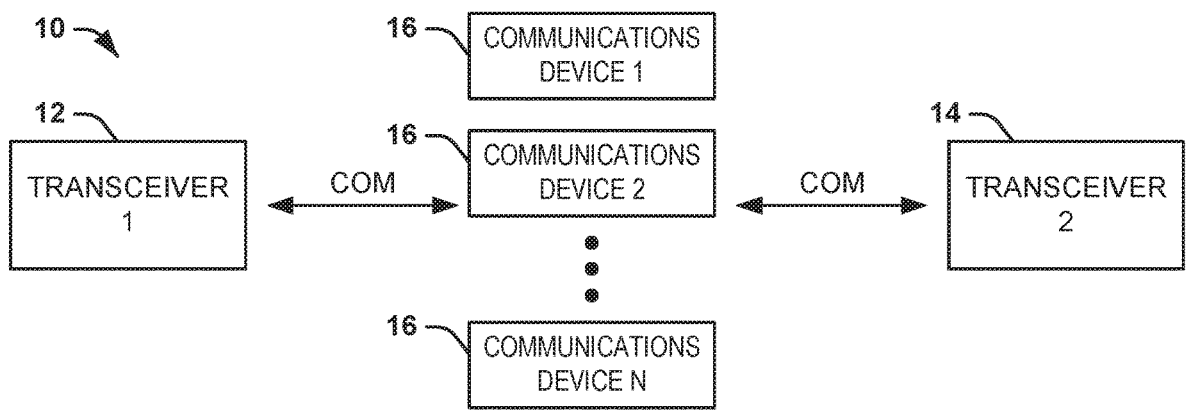
FIG. 1 illustrates an example of a distributed communication system.

FIG. 1 illustrates an example of a distributed communication system 10. The distributed communication system 10 can be implemented in any of a variety of communication applications in which long-distance communication can be required over difficult, dangerous, or contested terrain. The distributed communication system 10 includes a first transceiver 12 and a second transceiver 14 that can each be arranged at a communication stations that are located at geographically disparate locations with respect to each other. The first and second transceivers 12 and 14 are configured to provide communication signals COM between each other, such as wireless communication signals (e.g., via respective antennas). As an example, the first and second transceivers 12 and 14 can be located on opposite sides of geographically blocking terrain (e.g., mountains) or located at an extreme distance with respect to each other, such that direct communication between the first and second transceivers 12 and 14 may be prohibitive. As another example, one or both of the first and second transceivers 12 and 14 can be located in a contested area, or can be separated by a contested area, such that communication between the first and second transceivers 12 and 14 can be subject to interception by hostile forces. As yet another example, one or both of the first and second transceivers 12 and 14 can be mobile (e.g., vehicle mounted), such that conditions of the communication environment between them can be subject to change (e.g., based on environmental or contested considerations).

To facilitate communication between the first and second transceivers 12 and 14, the distributed communication system 10 includes a plurality N of launchable communications devices 16, where N is a positive integer. Each of the launchable communications devices 16 can be launched for deployment in a geographic location between the first and second transceivers 12 and 14, and can thus provide communications capability with respect to the communication signals COM. As described herein, the term "communications capability" with respect to the launchable communications devices 16 refers to a capability for transmitting, receiving, routing, relaying, intercepting, broadcasting, or any of a variety of other ways of transmitting and/or receiving the communication signals COM. As an example, a given one of the launchable communications devices 16 can be configured to receive a communications signal COM (e.g., via one of the first and second transceivers 12 and 14 or via another one of the launchable communications devices 16), and can retransmit the communications signal COM (e.g., to the other one of the first and second transceivers 12 and 14 or to another one or more of the launchable communications devices 16). For example, the launchable communications devices 16 can be configured to provide point-to-point communications network capability, or can be configured to provide mesh communications network capability, as described in greater detail herein.

As described herein, the term "launchable" with respect to the launchable communications devices 16 refers to stand-alone wireless communication devices that are launched from, and thus separated from, a vehicle or a device (e.g., a hand-held device or a vehicle mounted device) initially in an airborne state, such that the respective launchable communications device 16 is deployed to a given operational environment from the airborne state to provide substantially immediate communications capability. As an example, the communications capability can be temporary, such as based on battery life. Therefore, upon launch from the respective vehicle or device, the launchable communications devices 16 provide substantially immediate communications capability in the distributed communication system 10 without any further configuration. As an example, each of the launchable communications devices 16 can be launched (e.g., via an aircraft) to a predetermined operational environment to which the respective launchable communications devices 16 are suited.

As an example, one or more of the launchable communications devices 16 can be deployed to a terrestrial operational environment, one or more of the launchable communications devices 16 can be deployed to an airborne operational environment, and one or more of the launchable communications devices 16 can be deployed to a nautical operational environment. Each of the launchable communications devices 16 can include deployment equipment that is configured to sustain a deployment state of the respective launchable communications device 16 with respect to the predetermined operational environment. Therefore, each of the launchable communications devices 16 can provide temporary communications capability, such as until battery life expires or until physical considerations prohibit capability, such as based on changes to the operational environment (e.g., movement of a respective launchable communications device 16 out of a useful position, such as via air or water currents). Accordingly, each of the launchable communications devices 16 can be configured as inexpensive and disposable communication devices.

Figure 2:
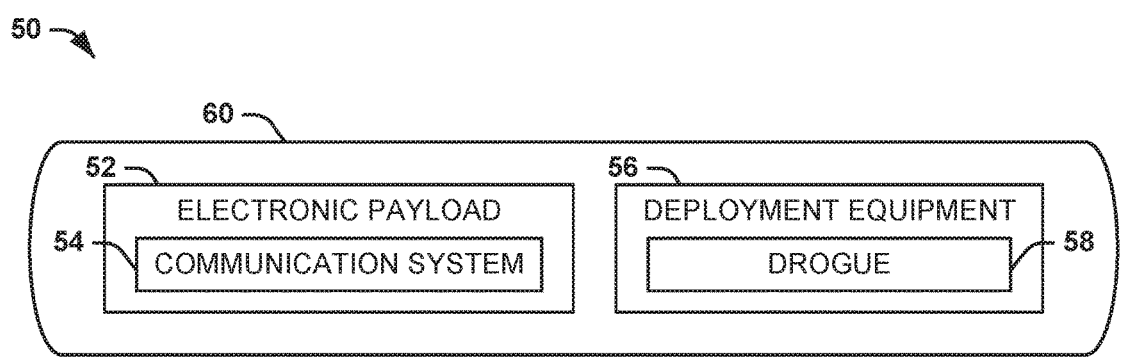
FIG. 2 illustrates an example of a launchable communications device.

FIG. 2 illustrates an example of a launchable communications device 50. The launchable communications device 50 can correspond to one of the launchable communications devices 16 in the example of FIG. 1, and thus provide communications capability in the distributed communication system 10. Therefore, reference is to be made to the example of FIG. 1 in the following description of the example of FIG. 2.

The launchable communications device 50 includes an electronic payload 52 that can include all of the electronic controls that are configured to control the launchable communications device 50, and can include a battery to provide power for the launchable communications device 50. In the example of FIG. 2, the electronic payload 52 includes a communication system 54 that is configured to provide the communications capability of the launchable communications device 50. As an example, the electronic payload 52 can include a receiver, a transmitter, and/or a transceiver that is configured to receive a communications signal (e.g., the communications signal COM) and to transmit a communications signal (e.g., the communications signal COM). For example, the electronic payload 52 can be configured to retransmit the received communications signal COM, such as using a common communication parameter (e.g., in a mesh network associated with the plurality of launchable communications devices 16 in the example of FIG. 1) or using a different communication parameter (e.g., in a point-to-point network associated with the plurality of launchable communications devices 16 in the example of FIG. 1). The communication system 54 can be configured as a wireless communication system to transmit and/or receive the communications signal COM as a radio frequency (RF) signal (e.g., an IEEE standard 802.11s signal, an ultra high-frequency (UHF) signal, and/or a Tactical Targeting Network Technology (TTNT) signal). Additionally or alternatively, the communication system 54 can be configured to transmit and/or receive the communications signal COM as an optical communications signal or as an acoustic communications signal. As yet another example, the communication system 54 can be configured to transmit and/or receive the communications signal COM in more than one communication medium (e.g., multiple wireless signals or a combination of wireless, acoustic, and optical signals).

The launchable communications device 50 also includes deployment equipment 56 configured to implement deployment of the launchable communications device 50 in a predetermined operational environment subsequent to launch, and to at least temporarily sustain a deployment state in the operational environment. As described herein, the term "operational environment" refers to the environment into which the launchable communications device 50 is deployed and intended to operate to provide communications capability. As also described herein, the term "deployment state" refers to the status of the launchable communications device 50 in the operational environment. In the example of FIG. 2, the deployment equipment 56 includes a drogue 58 (e.g., a parachute), such as to mitigate damage to the launchable communications device 50 during deployment of the launchable communications device 50 from the airborne state subsequent to launch and/or to provide a more controlled deployment of the launchable communications device 50. The electronic payload 52 can be configured to provide electronic control of the deployment equipment 56, such as during launch, during a transition to an operational environment from the airborne deployment state, and during deployment, as described herein (e.g., to facilitate deployment of the drogue 58 during deployment from the airborne deployment state and/or to detach the drogue 58 subsequent to deployment in the operational environment).

In the example of FIG. 2, the electronic payload 52 and the deployment equipment 56 are demonstrated as being enclosed within a rigid housing 60. The rigid housing 60 can be configured to facilitate launch and/or deployment of the launchable communications device 50. For example, the rigid housing 60 can have a substantially tubular shape (e.g., with a circular, hexagonal, or square cross-sectional shape) and can be dimensioned to facilitate launch of the launchable communications device 50 from a launch system, such as a tube launcher, a pylon launcher, an internal launcher or a variety of other types of launch devices. As an example, the launch device can be a legacy launch system, such as to provide launch capability from existing and repurposed vehicle-mounted launchers (e.g., tube launchers). Therefore, existing aircraft need not be retrofitted with special launch systems to be able to deploy the launchable communications device 50, but can instead launch the launchable communications device 50 from an existing legacy launch system (e.g., tube launchers, etc.). In addition, the rigid housing 60 can be configured to protect the electronic payload 52 and the conveyance equipment 56, such as prior to and during launch of the launchable communications device 50, and such as while the launchable communications device 50 is sustained in the operational environment. For example, the rigid housing 60 can be waterproof to protect the electronic payload 52 in the nautical operational environment, as described herein.

In addition to providing the communications capability via the communications system 54, the electronic payload 52 can be configured to provide additional functionality of the launchable communications device 50 during deployment, such as in an espionage application. As an example, the electronic payload 52 can include the capability of jamming and/or spoofing communications signals (e.g., RF communications signals), such as associated with a hostile or adversarial communications system. As another example, the electronic payload 52 can include communications signal intercept capability to be able to intercept communication signals from a hostile or adversarial communication system. As yet another example, the electronic payload 52 can be configured to provide pseudo-global navigation satellite system (GNSS) signal generation capability, such as to confuse location-based receivers of hostile or adversarial devices. As a further example, the electronic payload 52 can also provide surveillance capability, such as by incorporating video equipment to capture video images (e.g., still images or video streams in real-time). Thus, the communication system 54 can provide a signal that can include data associated with intercepted communications signals or video data. Accordingly, the launchable communications device 50 can be configured in a variety of ways.

Figure 3:
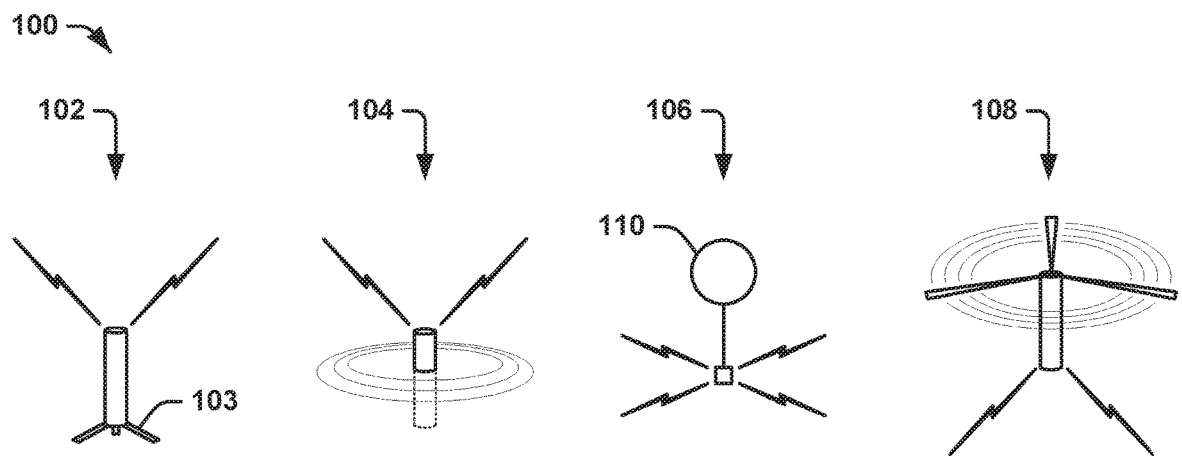
FIG. 3 illustrates an example diagram of launchable communications devices.

FIG. 3 illustrates an example diagram 100 of launchable communications devices. The diagram 100 demonstrates different types of launchable communications devices 50 that can each correspond to a respective launchable communications device 16 in the example of FIG. 1. Thus, reference is to be made to the examples of FIGS. 1 and 2 in the following description of the example of FIG. 3. The different types of launchable communications devices 50 provided in the diagram 100 are thus demonstrative of a launchable communications device 50 being sustained in different operational environments.

One example of an operational environment includes a terrestrial environment, demonstrated at 102 in the example of FIG. 3. At 102, the launchable communications device 50 is deployed onto a terrestrial surface of land, which can include deployment onto a man-made structure (e.g., the roof of a building). The drogue 58 can thus facilitate a safe landing of the launchable communications device 50 onto the surface of the terrestrial operational environment. As an example, the electronic payload 52 can be configured to detach the drogue 58 upon deployment of the launchable communications device 50 on the terrestrial operational environment to prevent the drogue 58 from the moving/tipping the launchable communications device 50. The deployment equipment 56 can include terrestrial landing equipment, such as deployable legs or a stand (e.g., a tripod), demonstrated at 103, to maintain an upright position of an associated antenna in the communication system 54. Therefore, the deployment state of the launchable communications device 50 can be a sustained standing or upright position of the launchable communications device 50 on the terrestrial surface. Upon deployment of the launchable communications device 50 in the terrestrial operational environment, the launchable communications device 50 can be configured to implement communications capability.

Another example of a operational environment includes a nautical environment, demonstrated at 104 in the example of FIG. 3. At 104, the launchable communications device 50 is deployed onto the surface of a body of water, though it is to be understood that operational environment could include submersion beneath the surface of the body of water. The drogue 58 can thus facilitate a safe landing of the launchable communications device 50 onto the surface of or just beneath the surface of the nautical operational environment, such as in shallower waters or to prevent damage to the rigid housing 60 (e.g., from impact with the surface of the body of water or from a depth of descent of the launchable communications device 50 upon impact with the body of water). As an example, the electronic payload 52 can be configured to detach the drogue 58 upon deployment of the launchable communications device 50 on/beneath the nautical operational environment to prevent the drogue 58 from the moving the launchable communications device 50. The deployment equipment 56 can include a float within the rigid housing 60 to provide buoyancy of the launchable communications device 50. Therefore, the deployment state of the launchable communications device 50 can be a sustained floating of the launchable communications device 50 on the surface or just beneath the surface of the in the airborne environment. Upon deployment of the launchable communications device 50 in the nautical operational environment, the launchable communications device 50 can be configured to implement communications capability.

Yet another example of a operational environment includes an airborne environment, as demonstrated at 106 and 108. At 106, the launchable communications device 50 is deployed in and floating through the air via a balloon 110, and at 108, the launchable communications device 50 is deployed in and flying through the air via airborne propulsion equipment 112. Therefore, the launchable communications device 50 can transition from the airborne state after launch to the airborne operational environment, all while airborne. The drogue 58 can thus facilitate a slower, controlled descent of the launchable communications device 50 through the air, such as to substantially mitigate an undesired drop in altitude of the launchable communications device 50 before completion of the deployment of the launchable communications device 50 in the airborne operational environment via the deployment equipment 56 (e.g., inflation of the balloon 110 at 106 or activation of the airborne propulsion equipment 112 at 108). As an example, the electronic payload 52 can be configured to detach the drogue 58 upon deployment of the launchable communications device 50 in the airborne operational environment to reduce a weight of the launchable communications device 50 in the airborne operational environment. Additionally, the electronic payload 52 can be configured to detach the rigid housing 60 upon deployment of the launchable communications device 50 in the airborne operational environment to reduce a weight of the launchable communications device 50 in the airborne operational environment.

The deployment equipment 56 can thus include the deflated balloon 110 or the collapsed airborne propulsion equipment 112 that is enclosed within the rigid housing 60 during launch, and thus prior to deployment of the launchable communications device 50, and which can thus be emitted from the rigid housing 60 during airborne deployment of the launchable communications device 50 via the electronic payload 52 from the airborne state. Therefore, the deployment state of the launchable communications device 50 can be a sustained passive floating of the launchable communications device 50 in the airborne operational environment at 106, or can be a sustained flying of the launchable communications device 50 in the airborne operational environment at 108, such that the launchable communications device 50 can act as an unmanned aerial-vehicle (UAV). In the example demonstrated at 108, the electronic payload 52 can include a memory configured to store flight instructions, or can include a receiver to receive flight instructions provided from a remote controller (e.g., at one of the first and second transceivers 12 and 14). Upon deployment of the launchable communications device 50 in the airborne operational environment, the launchable communications device 50 can be configured to implement communications capability.

Figure 4:
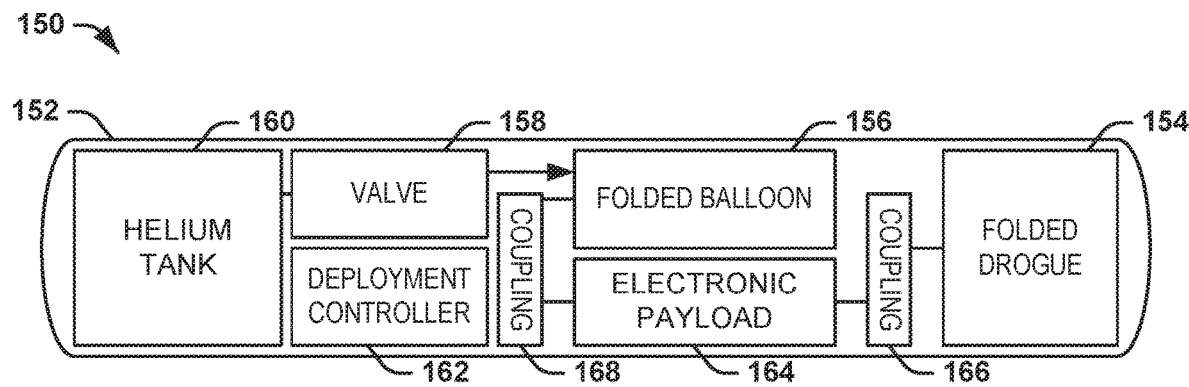
FIG. 4 illustrates an example of an airborne launchable communications device.

FIG. 4 illustrates an example of a launchable communications device 150. As an example, the launchable communications device 150 can correspond to the launchable communications device 50 demonstrated at 106 in the example of FIG. 3, and can be configured to provide communications capability in the distributed communication system 10 in an airborne operational environment. The launchable communications device 150 is demonstrated in the example of FIG. 4 in a pre-deployment state, and thus a storage state prior to launch, such as in a launch tube. Thus, the components of the launchable communications device 150 are demonstrated as enclosed within a rigid housing 152.

The launchable communications device 150 includes a folded drogue 154, a folded balloon 156, a helium tank 158, a valve 160, and a deployment controller 162 that can collectively correspond to the deployment equipment 56 in the example of FIG. 2. As an example, the deployment controller 162 can be configured to detect the launch of the launchable communications device 150, such as based on being launched from an aerial-vehicle launch tube. Therefore, during deployment of the launchable communications device 150 from the airborne state, the deployment controller 160 can be configured to initially deploy the folded drogue 154, such as based on opening an end of the rigid housing 152 that is proximal to the folded drogue 154. The folded drogue 154 can thus open to begin slowing a descent of the launchable communications device 150.

The drogue 154 is coupled to an electronic payload 164, such as similar to the electronic payload 52 in the example of FIG. 2, via a coupling 166 (e.g., ropes or cables). While the deployment controller 162 is demonstrated as separate from the electronic payload 164, it is to be understood that the deployment controller 162 could be incorporated as part of the electronic payload 164. The electronic payload 164 is similarly coupled to the folded balloon 156 via a coupling 168 (e.g., ropes or cables), and the folded balloon 156 can be coupled to the rigid housing 152 via the valve 160. Based on the coupling of the drogue 154 and the electronic payload 164 via the coupling 166, and based on the coupling of the balloon 156 with the electronic payload 164 via the coupling 168, the unfolding of the drogue 154 can pull the electronic payload 164 and the balloon 156 out of the rigid housing 152.

During deployment of the drogue 154, the deployment controller 162 can be further configured to activate the valve 158 to begin filling the balloon 156 with helium from the helium tank 160. The helium tank 160 can include a sufficient amount of helium to provide lift of the launchable communications device 150 in the airborne operational environment (e.g., a slightly positive lift at sea level, such as without the rigid housing, as described herein). Upon the balloon 156 being sufficiently full of helium provided from the helium tank 160 via the valve 158, the deployment controller 162 can be configured to detach the rigid housing 152, thus allowing rigid housing 152 to fall from remaining portions of the launchable communications device 150 that are held in the floating state by the inflated balloon 156. The remaining portions of the launchable communications device 150 can thus invert, such that the electronic payload 164 hangs from the balloon 156 via the coupling 168 and the drogue 154 hangs from the electronic payload 164. The deployment controller 162 can likewise be configured to detach the drogue 154, thus allowing the drogue 154 to fall from remaining portions of the launchable communications device 150 that are held in the floating state by the inflated balloon 156. As a result, the weight of rigid housing 152, the drogue 156, and the helium tank 160 can be mitigated from the physical load carried by the balloon 156 to allow the launchable communications device 150 to remain in the floating deployment state in the airborne operational environment. The electronic payload 164 can thus provide the communications capability upon deployment, or upon transition from the airborne state to the airborne operational environment (e.g., upon being pulled out of the rigid housing 152).

The launchable communications device 150 is but one example of a launchable communications device 50 that includes deployment equipment 56 that is configured to deploy the launchable communications device 150 in the airborne operational environment and to sustain the launchable communications device 150 in the airborne deployment state, similar to as demonstrated at 106 in the example of FIG. 3. It is to be understood that the deployment equipment 56 could include different equipment than that demonstrated in the example of FIG. 4 to deploy a given launchable communications device 50 in a different operational environment and to sustain the launchable communications device 50 in a different deployment state, instead of the folded drogue 154, the folded balloon 156, the helium tank 160, and the valve 158 of the launchable communications device 150. For example, the deployment equipment 56 could include folding legs or a variety of other terrestrial equipment to deploy the launchable communications device 50 in the terrestrial operational environment and to sustain the launchable communications device 50 in the terrestrial deployment state, similar to as demonstrated at 102 in the example of FIG. 3. As another example, the deployment equipment 56 could include a float (e.g., inflatable or otherwise) or a variety of other nautical equipment to deploy the launchable communications device 50 in the nautical operational environment and to sustain the launchable communications device 50 in the nautical deployment state, similar to as demonstrated at 104 in the example of FIG. 3. As yet another example, the deployment equipment 56 could include collapsible propulsion equipment (e.g., rotors) or a variety of other aerial equipment to deploy the launchable communications device 50 in the airborne operational environment and to sustain the launchable communications device 50 in the airborne deployment state, similar to as demonstrated at 108 in the example of FIG. 3. Accordingly, the launchable communications device 50 can be configured in a variety of different ways.

Figure 5:
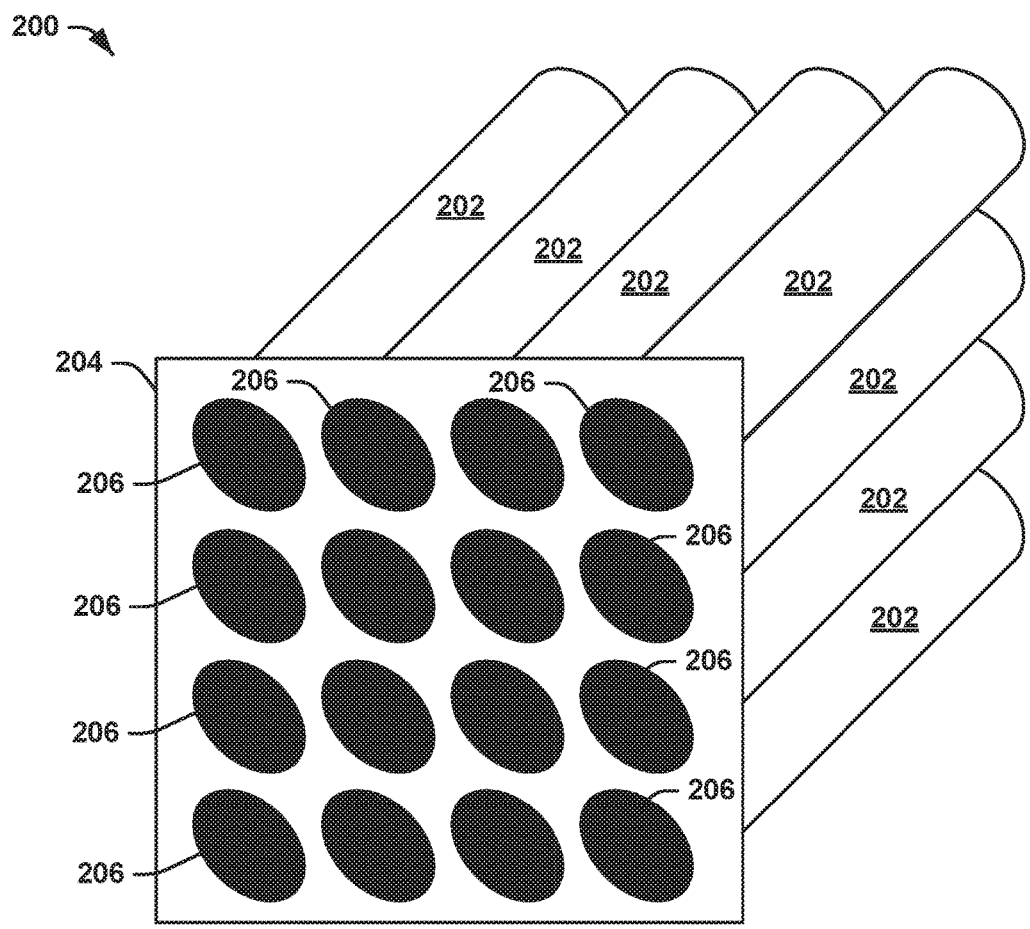
FIG. 5 illustrates an example of a tube launcher.

FIG. 5 illustrates an example of a tube launcher 200. As an example, the tube launcher 200 can be implemented on a vehicle, such as an aircraft. The tube launcher 200 can be configured to store and launch the launchable communications devices 16 in the distributed communication system 10, such as including any of a variety of launchable communications devices 50 for deployment in a variety of operational environments, such as demonstrated in the example of FIG. 3. In the example of FIG. 5, the tube launcher 200 includes a plurality of tubes 202 that are each configured to receive a respective one of the launchable communications devices 16 (e.g., the launchable communications device 50 in the example of FIG. 2 or the launchable communications device 150 in the example of FIG. 4). The tubes 202 are provided in a surface 204 via a respective plurality of holes 206 in the surface 204. Thus, each of the tubes 202 can store a respective one of the launchable communications devices 16 in a storage state (e.g., a pre-launch/pre-deployment state). In the example of FIG. 5, while the tube launcher 200 is demonstrated as having sixteen tubes 202, it is to be understood that the tube launcher 200 can be arranged in any of a variety of ways to receive, store, and launch the launchable communications devices 16.

As an example, the surface 204 can be a surface of an aircraft (e.g., a manned aircraft or a UAV). Thus, the respective aircraft can fly through a geographic region that separates the first and second transceiver 12 and 14 and launch the plurality of launchable communications devices 16 from the tube launcher 200. An aircraft can thus fly over geographically blocking terrain (e.g., mountains), along an extreme distance, or into or through a contested area, and thus launch the launchable communications devices 16 via the tube launcher 200 in the flight path between the first and second transceiver 12 and 14. As an example, the tube launcher 200 can be typically configured to launch legacy devices, such as sonobuoys, dropsondes, aerosondes, chaff, flares, or a variety of other types of typical devices and ordnance that can be launched from an aircraft in a variety of different mission parameters. For example, each of the tubes 202 of the tube launcher 200 can include a compressed air launch mechanism to launch the variety of devices from the respective tube 202. As an example, each of the launchable communications devices 16 (e.g., the launchable communications device 50) can have dimensions (e.g., the rigid housing 60) and a mass that is substantially similar to the legacy devices that can be launched from the tube launcher 200. Therefore, the tube launcher 200 can be repurposed to launch the launchable communications devices 16 via the compressed air launching mechanism in a similar manner to the launching of the other typical devices, such that the aircraft is not modified in any manner to launch the launchable communications devices 16 to establish the distributed communication system 10. Accordingly, the distributed communication system 10 can be provided in a manner that is inexpensive and simple to deploy based on the inexpensive and disposable launchable communications devices 16 and based on the usability of existing deployment equipment to launch the launchable communications devices 16 for deployment to the respective operational environments.

Figure 6:
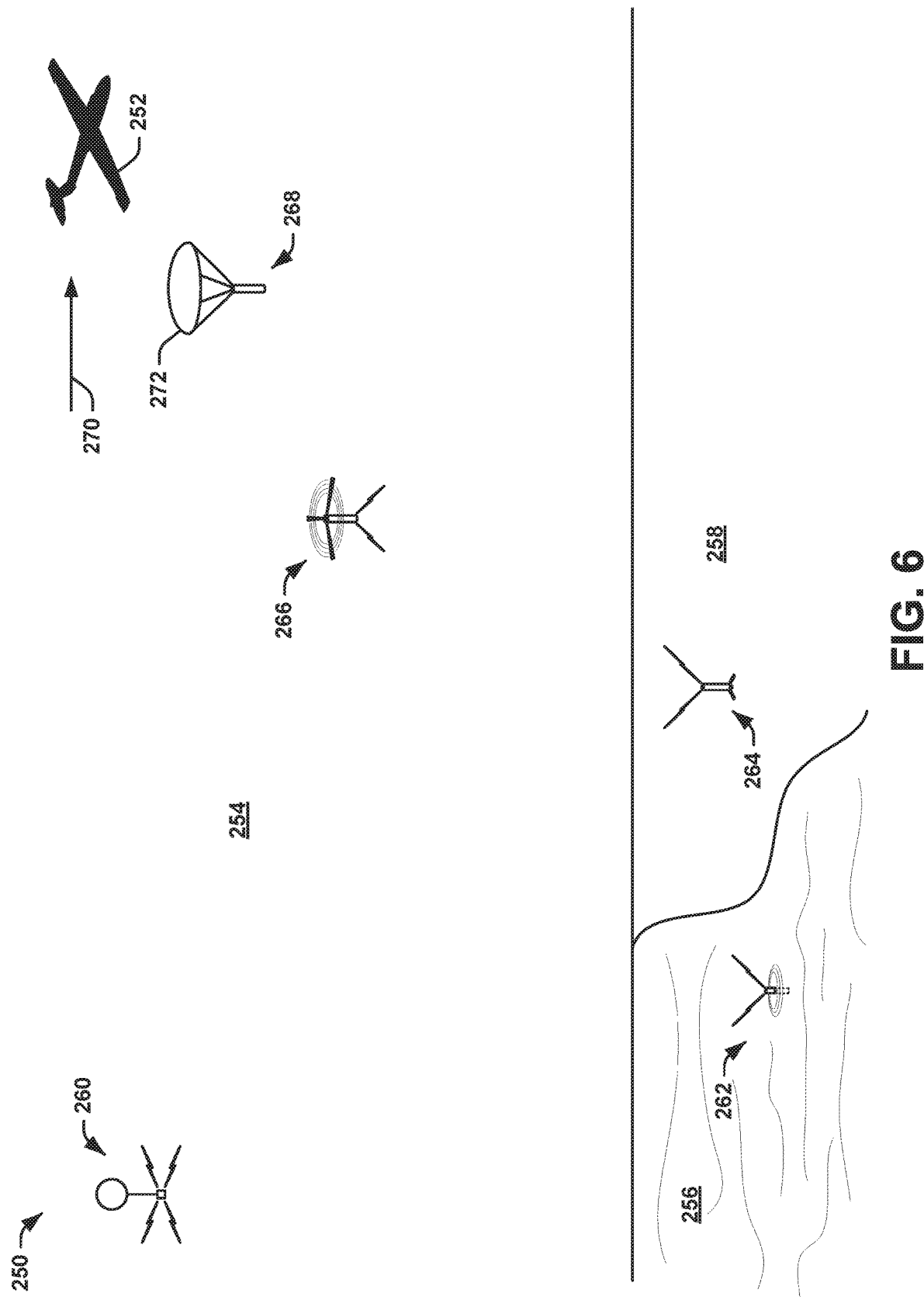
FIG. 6 illustrates an example diagram of deployment of launchable communications devices.

FIG. 6 illustrates an example diagram 250 of deployment of launchable communications devices. The diagram 250 demonstrates an aircraft 252 (e.g., a manned aircraft or a UAV) flying over a geographic region and launching a plurality of launchable communications devices as the aircraft 252 flies over the geographic region. The geographic region includes an airborne operational environment 254, a nautical operational environment 256, and a terrestrial operational environment 258. In the example of FIG. 6, the aircraft 252 has launched a first launchable communications device 260, a second launchable communications device 262, a third launchable communications device 264, a fourth launchable communications device 266, and a fifth launchable communications device 268 as it traverses the geographic region in the direction indicated by the arrow 270. As an example, the launchable communications devices 260, 262, 264, 266, and 268 can have been launched via a tube launcher mounted on the aircraft 252 (e.g., the tube launcher 200). For example, the launchable communications devices 260, 262, 264, 266, and 268 can be launched miles apart with respect to each other. In addition, while the diagram 250 demonstrates only a single aircraft 252, it is to be understood that the launch of the launchable communications devices 260, 262, 264, 266, and 268 can be provided by a plurality of vehicles, such as multiple aerial-vehicles.

In the example of FIG. 6, the first launchable communications device 260 is demonstrated as having been fully deployed in the airborne operational environment 254, and is demonstrated as substantially similar to the launchable communications device 50 demonstrated at 106 in the example of FIG. 3. Therefore, the first launchable communications device 260 is floating in an airborne deployment state in the airborne operational environment 254 via a balloon (e.g., similar to the launchable communications device 150 in the example of FIG. 4) to provide the communications capability. The second launchable communications device 262 is demonstrated as having been fully deployed in the nautical operational environment 256, and is demonstrated as substantially similar to the launchable communications device 50 demonstrated at 104 in the example of FIG. 3. Therefore, the second launchable communications device 262 is floating in the nautical deployment state in the nautical operational environment 256, such as via a float device, to provide the communications capability. The third launchable communications device 264 is demonstrated as having been fully deployed in the terrestrial operational environment 258, and is demonstrated as substantially similar to the launchable communications device 50 demonstrated at 102 in the example of FIG. 3. Therefore, the third launchable communications device 264 remains stationary while standing in the terrestrial deployment state in the terrestrial operational environment 258, such as via collapsible legs, to provide the communications capability. The fourth launchable communications device 266 is demonstrated as having been fully deployed in the airborne operational environment 252, and is demonstrated as substantially similar to the launchable communications device 50 demonstrated at 108 in the example of FIG. 3. Therefore, the fourth launchable communications device 266 is floating in the airborne deployment state in the airborne operational environment 254, such as via collapsible propulsion equipment, to provide the communications capability. The fifth launchable communications device 268 is demonstrated as being in the process of being deployed from the airborne state after launch, and is thus demonstrated as having deployed a drogue 272 to slow the descent of the fifth launchable communications device 268. Thus, the fifth launchable communications device 268 can continue deployment to one of the airborne operational environment 252, the nautical operational environment 254, and the terrestrial operational environment 256 to begin providing the communications capability upon being fully deployed.

Figure 7:
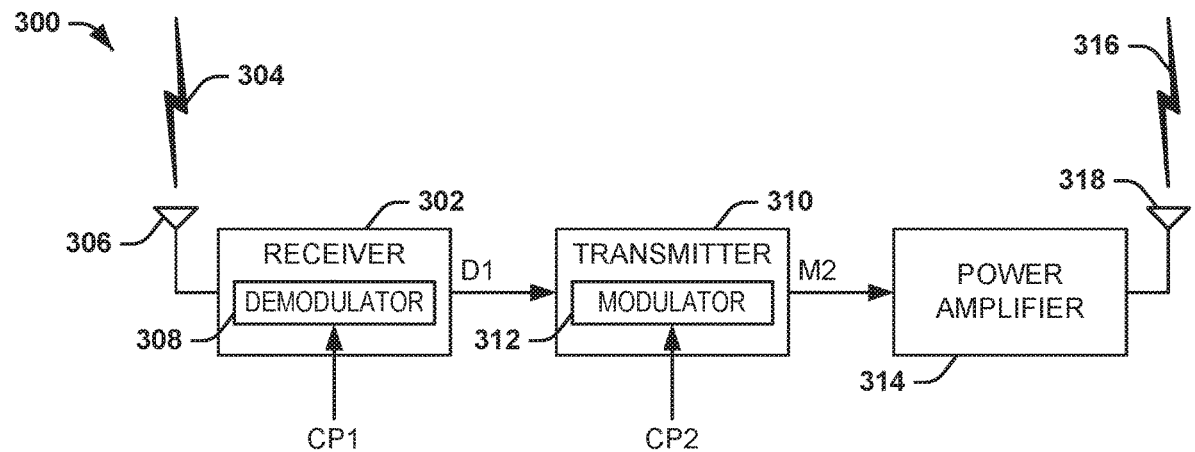
FIG. 7 illustrates an example of a communication system of a launchable communications device.

FIG. 7 illustrates an example of a communication system 300 of a launchable communications device. As an example, the communication system 300 can correspond to the communication system 54 that is part of the electronic payload 52 of the launchable communications device 50 in the example of FIG. 2. As an example, the communication system 300 can be implemented in a distributed communication system 10 that implements point-to-point network communication between the first transceiver 12 and the second transceiver 14.

The communication system 300 includes a receiver 302 that is configured to receive a first communication signal 304 via an antenna 306. The first communication signal 304 can, for example, be an RF communication signal that is provided from one of the first and second transceivers 12 and 14, or from another one of the launchable communications devices 16 in the distributed communication system 10. The receiver 302 includes a demodulator 308 that is configured to demodulate the first communications signal 304 via a first communication parameter, demonstrated in the example of FIG. 7 as communication parameter CP1. As an example, the first communication parameter CP1 can be any of a variety of modulation parameters that can be implemented to demodulate the first communication signal 304, such as carrier frequency, amplitude modulation envelope, time-division multiplexing code, spread-spectrum code, or any of a variety of other types of modulation parameters. For example, the communication parameter CP1 can be specific to the launchable communications device that includes the communication system 300, such that the first communication signal 304 can have been transmitted specifically for receipt by the communication system 300.

The demodulated first communication signal, demonstrated in the example of FIG. 7 as D1, is provided from the receiver 302 to a transmitter 310 that is configured to modulate the demodulated first communication signal D1 to generate a modulated second communication signal M2. The transmitter 310 includes a modulator 312 that is configured to modulate the demodulated first communication signal D1 via a second communication parameter CP2 that is different from the first communication parameter CP1. As an example, the second communication parameter CP2 can be any of a variety of modulation parameters that can be implemented to modulate a communication signal, such as carrier frequency, amplitude modulation envelope, time-division multiplexing code, spread-spectrum code, or any of a variety of other types of modulation parameters. The second communication parameter CP2 can be a different communication parameter of the same type of communication parameter as the first communication parameter CP1, such as a different carrier frequency or a different code, or can be a different type of communication parameter as the first communication parameter CP1.

The modulated second communication signal M2 is provided to a power amplifier 314 that is configured to amplify the modulated second communication signal M2 for transmission as a second communication signal 316 via an antenna 318. The second communication signal 316 can, for example, be an RF communication signal that is provided to one of the first and second transceivers 12 and 14, or to another one of the launchable communications devices 16 in the distributed communication system 10. Therefore, the second communication signal 316 can be specific to a given one communication node in the distributed communication system 10, such that the communication system 300 is provided in the respective launchable communications device to provide point-to-point network communications in the distributed communication system 10.

It is to be understood that the communication system 300 is not intended to be limited to the example of FIG. 7. As an example, while the communication system 300 demonstrates that the first communication signal 304 is received at a first antenna 306 and the second communication signal 316 is transmitted from a second antenna 318, the communication system 300 could instead include only a single antenna that is configured to both transmit and receive the respective first and second communications signals 304 and 316. In addition, while the communication system 300 is described in the example of FIG. 7 as transmitting and receiving RF signals, respectively, it is to be understood that one or both of the first communication signal 304 and the second communication signal 316 could be implemented as other types of signals, such as optical signals or acoustic signals. Therefore, the communication system 300 can be configured in any of a variety of ways.

Figure 8:
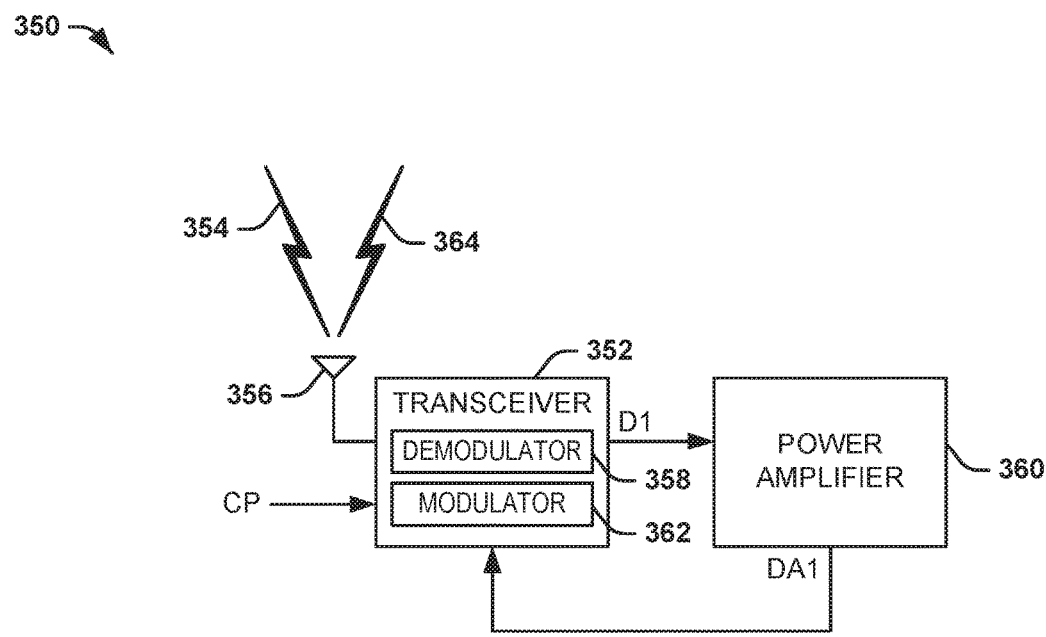
FIG. 8 illustrates another example of a communication system of a launchable communications device.

FIG. 8 illustrates another example of a communication system 350 of a launchable communications device. As an example, the communication system 350 can correspond to the communication system 54 that is part of the electronic payload 52 of the launchable communications device 50 in the example of FIG. 2. As an example, the communication system 350 can be implemented in a distributed communication system 10 that implements mesh network communication between the first transceiver 12 and the second transceiver 14.

The communication system 350 includes a transceiver 352 that is configured to receive a first communication signal 354 via an antenna 356. The first communication signal 354 can, for example, be an RF communication signal that is provided from one of the first and second transceivers 12 and 14, or one or more of the launchable communications devices 16 in the distributed communication system 10. The transceiver 352 includes a demodulator 358 that is configured to demodulate the first communications signal 354 via a communication parameter, demonstrated in the example of FIG. 8 as communication parameter CP. As an example, the communication parameter CP can be any of a variety of modulation parameters that can be implemented to demodulate the first communication signal 354, such as carrier frequency, amplitude modulation envelope, time-division multiplexing code, spread-spectrum code, or any of a variety of other types of modulation parameters.

The demodulated communication signal, demonstrated in the example of FIG. 8 as D1, is provided from the transceiver 352 to a power amplifier 360 that is configured to amplify the demodulated communication signal D1 to provide an amplified communication signal DA1 back to the transceiver 352. The transceiver 352 also includes a modulator 362 that is configured to modulate the amplified communication signal DA1 via the communication parameter CP to generate a modulated second communication signal that can correspond to an amplified version of the first communication signal 354. The amplified communication signal DA1 can thus be transmitted via the antenna 356 as a second communication signal 364. The second communication signal 364 can thus be transmitted for receipt by any of the other launchable communications devices 16 in the distributed communication system 10 or one or both of the first and second transceivers 12 and 14. Therefore, the second communication signal 364 is not specific to a given one communication node in the distributed communication system 10, such that the communication system 350 is provided in the respective launchable communications device to provide mesh network communications in the distributed communication system 10.

It is to be understood that the communication system 350 is not intended to be limited to the example of FIG. 8. In addition, while the communication system 350 is described in the example of FIG. 8 as transmitting and receiving RF signals, respectively, it is to be understood that one or both of the first communication signal 354 and the second communication signal 364 could be implemented as other types of signals, such as optical signals or acoustic signals. In other words, despite the communication system 350 being implemented in a mesh network, the communication system 350 could be one of a plurality of communication systems in a given one of the launchable communications devices 16, such that the first and/or second communication signals 354 and 364 can be simulcast in different communication media from each of or a subset of the launchable communications devices 16. Therefore, the communication system 350 can be configured in any of a variety of ways.

Figure 9:
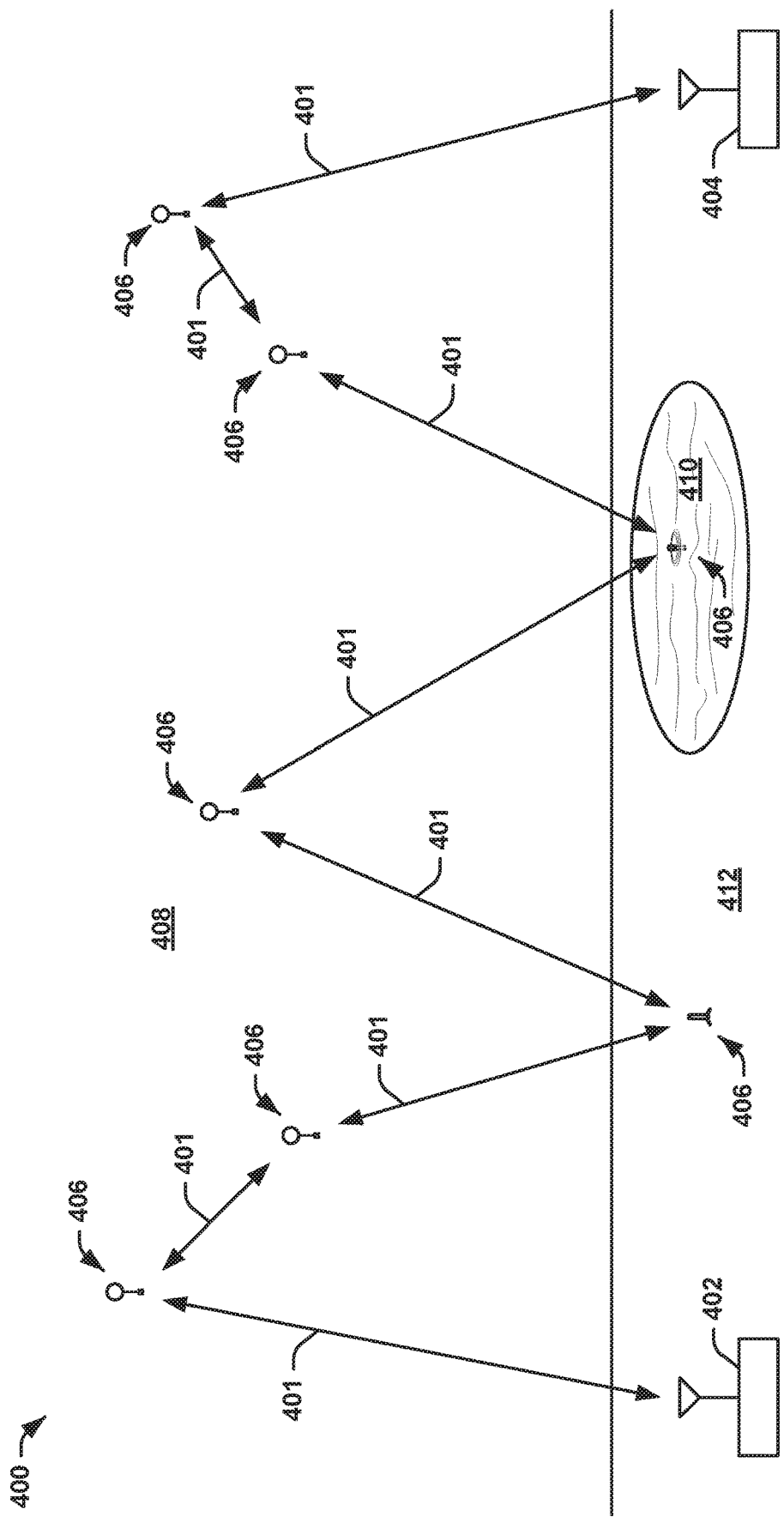
FIG. 9 illustrates another example of a distributed communication system.

FIG. 9 illustrates another example of a distributed communication system 400. The distributed communication system 400 is demonstrated as a point-to-point communications network to transmit a communications signal 401, demonstrated as a bi-directional arrow, such as in any of a variety of communication applications in which long-distance communication can be required over difficult, dangerous, or contested terrain. The distributed communication system 400 includes a first communication station 402 and a second communication station 404 that can include the first and second transceivers 12 and 14, respectively, in the example of FIG. 1. As an example, each of the first and second communication stations 402 and 404 can be any of a variety of communication stations, such as fixed radio stations, aircraft, land vehicles, nautical vehicles, satellites, and/or hand-held radios. For example, the first and second communication stations 402 and 404 can be located on opposite sides of geographically blocking terrain (e.g., mountains) or located at an extreme distance with respect to each other, such that direct communication between the first and second communication stations 402 and 404 may be prohibitive. As another example, one or both of the first and second communication stations 402 and 404 can be located in a contested area, or can be separated by a contested area, such that communication between the first and second communication stations 402 and 404 can be subject to interception by hostile forces.

To facilitate communication between the first and second communication stations 402 and 404, the distributed communication system 400 includes a plurality of launchable communications devices 406. Each of the launchable communications devices 406 are demonstrated as deployed in respective operational environments, demonstrated as an airborne operational environment 408, a nautical operational environment 410, and a terrestrial operational environment 412. Thus, the launchable communications devices 406 can have been launched and deployed at a prior time to establish communication between the first and second communication stations 402 and 404, and can thus provide communications capability with respect to the communication signals 401.

For example, the second communication station 404 can be an aircraft, and can include a tube launcher (e.g., the tube launcher 200 in the example of FIG. 5) to maintain communication with the first communication station 402 as it travels across the geographic region.

As an example, each of the launchable communications devices 406 includes a communication system to facilitate point-to-point network communications, such as the communication system 300 in the example of FIG. 7. Therefore, each of the launchable communications devices 406 is configured to receive a communications signal 401 (e.g., via one of the first and second communication stations 402 and 404 or via a previous one of the launchable communications devices 406 along the communication path between the first and second communication stations 402 and 404), and can retransmit the communications signal 401 (e.g., to the first or second communication stations 402 or 404 or to a next one of the launchable communications devices 406 along the communication path between the first and second communication stations 402 and 404). For example, similar to as described previously in the example of FIG. 7, the communication system in each of the launchable communications devices 406 can be configured to demodulate the communications signal 401 via a first communication parameter (e.g., the communication parameter CP1), modulate the communications signal 401 via a second communication parameter (e.g., the communication parameter CP2) that can be processed by a next launchable communications device 406 in the point-to-point network, and can be amplified and transmitted (e.g., as the second communication signal 316) as the communication signal 401 to the next launchable communications device 406.

Thus, the distributed communication system 400 demonstrates transmission of the communications signal 401 between the first and second communication stations 402 and 404 via the launchable communications devices 406 in a point-to-point communications network. The distributed communication system 400 demonstrates that the launchable communications devices 406 can be deployed to a combination of the separate operational environments 408, 410, and 412 to maintain the distributed communication system 400 in an at least temporary state to transmit the communications signal 401. In the point-to-point network demonstrated by the distributed communication system 400, it is to be understood that the communications signal 401 is not limited to being received at only one and retransmitted to only one of the launchable communications devices 406. For example, one or more of the launchable communications devices 406 can be configured as redundant nodes in the point-to-point network demonstrated by the distributed communication system 400. Therefore, the distributed communication system 400 can be maintained in the event of a failure or interception (e.g., by hostiles in a contested environment).

Figure 10:
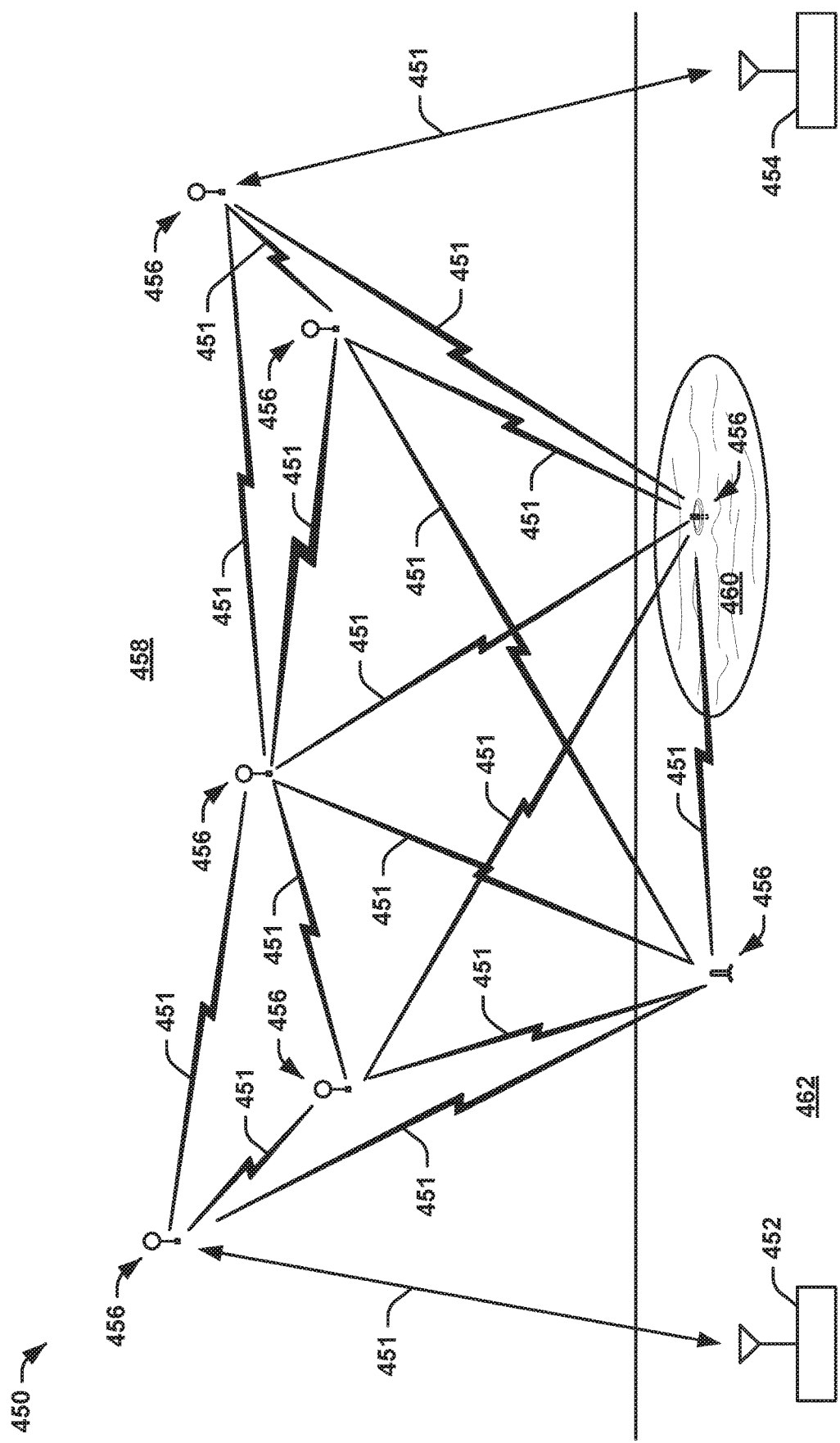
FIG. 10 illustrates yet another example of a distributed communication system.

FIG. 10 illustrates yet another example of a distributed communication system 450. The distributed communication system 450 is demonstrated as a mesh communications network to transmit communications signals 451, demonstrated as bi-directional signals, such as in any of a variety of communication applications in which long-distance communication can be required over difficult, dangerous, or contested terrain. Similar to as described previously in the example of FIG. 9, the distributed communication system 450 includes a first communication station 452 and a second communication station 454 that can include the first and second transceivers 12 and 14, respectively, in the example of FIG. 1, and which be any of a variety of communication stations located such that direct communication between the first and second communication stations 452 and 454 may be prohibitive.

To facilitate communication between the first and second communication stations 452 and 454, the distributed communication system 450 includes a plurality of launchable communications devices 456. Each of the launchable communications devices 456 are demonstrated as deployed in respective operational environments, demonstrated as an airborne operational environment 458, a nautical operational environment 460, and a terrestrial operational environment 462. Thus, the launchable communications devices 456 can have been launched and deployed at a prior time to establish communication between the first and second communication stations 452 and 454, and can thus provide communications capability with respect to the communication signals 451. For example, the second communication station 454 can be an aircraft, and can include a tube launcher (e.g., the tube launcher 200 in the example of FIG. 5) to maintain communication with the first communication station 452 as it travels across the geographic region.

As an example, each of the launchable communications devices 456 includes a communication system to facilitate mesh network communications, such as the communication system 350 in the example of FIG. 8. Therefore, each of the launchable communications devices 456 is configured to receive a communications signal 451 (e.g., via one of the first and second communication stations 452 and 454, or via another one of the launchable communications devices 456), and can retransmit the communications signal 451 (e.g., to the first and second communication stations 452 and 454, and/or to any of the launchable communications devices 456 in communication range). For example, similar to as described previously in the example of FIG. 8, the communication system in each of the launchable communications devices 456 can be configured to demodulate the communications signal 451 via a communication parameter (e.g., the communication parameter CP), amplify the demodulated communications signal 451, and remodulate the communications signal 451 via the communication parameter to retransmit the communication signal 451 to any other launchable communications devices 456 in communications range and/or to the first or the second communication stations 452 and 454.

Thus, the distributed communication system 450 demonstrates transmission of the communications signal 451 between the first communication station 452 and the second communication station 454 via the launchable communications devices 456 in a mesh communications network. The distributed communication system 450 demonstrates that the launchable communications devices 456 can be deployed to a combination of the separate operational environments 458, 460, and 462 to maintain the distributed communication system 450 in an at least temporary state to transmit the communications signals 451 between the first and second communication stations 452 and 454. In the mesh network demonstrated by the distributed communication system 450, it is to be understood that the communications signal 451 is not limited to transmitted in a mesh network manner throughout the distributed communication system 450. For example, the distributed communication system 450 can include a combination of point-to-point network and mesh network with respect to the launchable communications devices 456.

Figure 11:
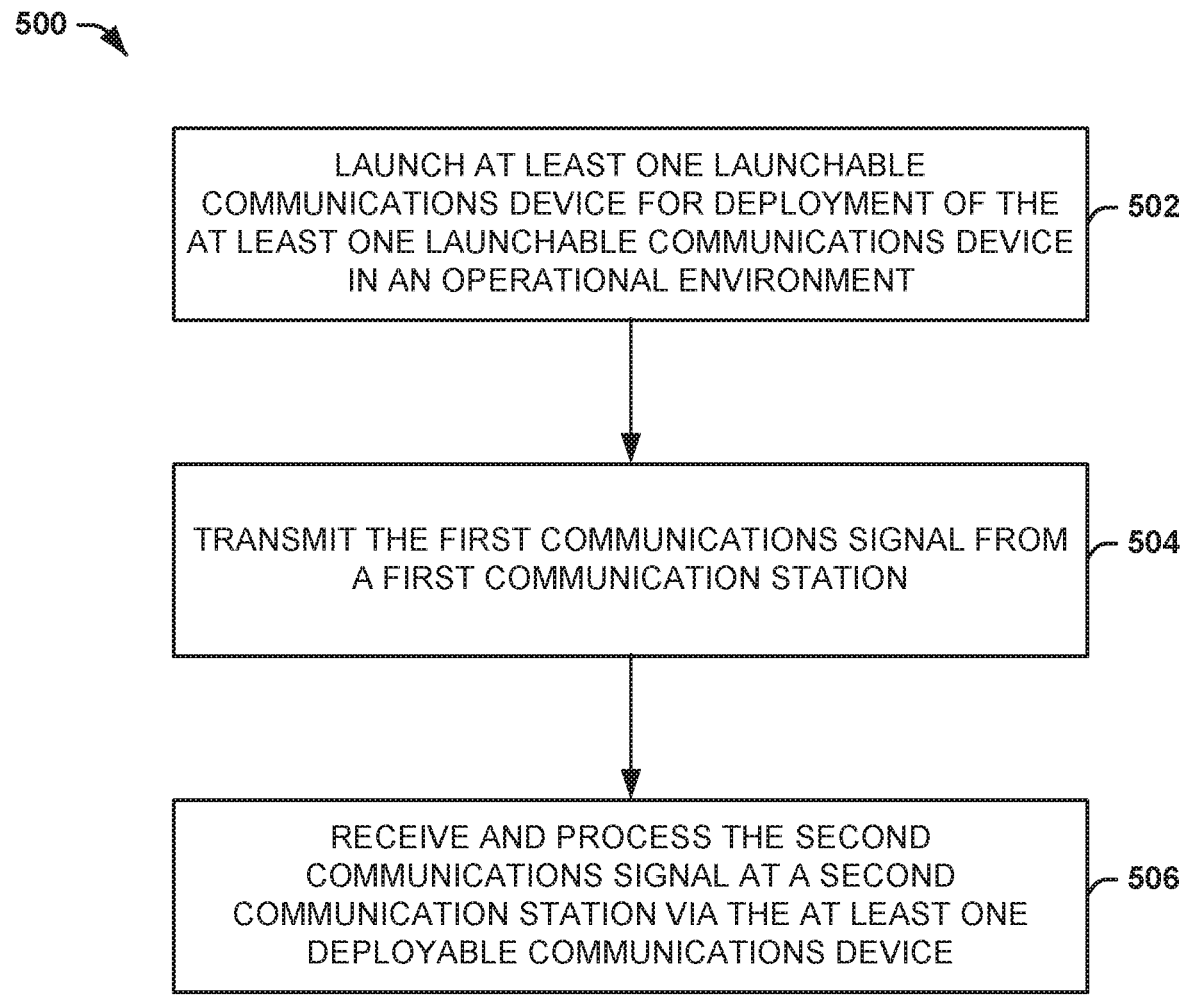
FIG. 11 illustrates an example of a method for providing a distributed communication system.

In view of the foregoing structural and functional features described above, a methodology in accordance with various aspects of the present invention will be better appreciated with reference to FIG. 11. While, for purposes of simplicity of explanation, the methodology of FIG. 11 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 11 illustrates an example of a method 500 for providing a distributed communication system (e.g., the distributed communication system 10). At 502, at least one launchable communications device (e.g., the launchable communications device 16) is deployed via a vehicle (e.g., the aerial-vehicle 252). The at least one launchable communications device can include a communication system (e.g., the communication system 54) configured to receive a first communications signal (e.g., the first communications signals 304 or 354) and to transmit a second communications signal (e.g., the communications signals 316 or 364). At 504, the first communications signal is transmitted from a first communication station (e.g., the first communication stations 402 or 452, e.g., via the first transceiver 12). At 506, the second communications signal is received and processed at a second communication station (e.g., the second communication stations 404 or 454, e.g., via the second transceiver 14) via the at least one launchable communications device.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method for providing a distributed communication system, the method comprising:
launching at least one launchable communications device via an aerial-vehicle mounted tube launcher, the at least one launchable communications device comprising deployment equipment, a deployment controller, and a rigid housing, the deployment equipment being substantially enclosed within the rigid housing prior to and during at least a portion of deployment, the at least one launchable communications device further comprising a communication system configured to receive a first communications signal and to transmit a second communications signal; and
controlling the deployment equipment via the deployment controller to at least one of initiate and sustain deployment of the at least one launchable communications device to the predetermined operational environment via the deployment equipment.

2. The method of claim 1, wherein the predetermined operational environment is a terrestrial operational environment, wherein the deployment equipment is a supporting device configured to prevent movement and to maintain an upright position of an antenna of the communications system of the at least one launchable communications device on the terrestrial operational environment.

3. The method of claim 2, wherein during deployment of the at least one launchable communications device to the terrestrial operational environment the deployment controller extends the supporting device from the rigid housing.

4. The method of claim 1, wherein the predetermined operational environment is a nautical operational environment, wherein the deployment equipment is a floatation device configured to provide buoyancy to the at least one launchable communications device at or just beneath the surface of the nautical operational environment.

5. The method of claim 4, wherein the deployment controller inflates the floatation device in the rigid housing during deployment of the at least one launchable communications device to the nautical operational environment.

6. The method of claim 5, wherein the floatation device is maintained within the rigid housing during deployment of the at least one launchable communications device to the nautical operational environment.

7. The method of claim 1, wherein the predetermined operational environment is an airborne operational environment, wherein the deployment equipment is a balloon configured to maintain passive floating of the at least one launchable communications device in the airborne operational environment.

8. The method of claim 7, wherein the deployment controller opens an end of the rigid housing and activates a valve to fill the balloon with helium stored in a tank in the rigid housing during deployment of the at least one launchable communications device to the airborne operational environment.

9. The method of claim 8, wherein the deployment controller is configured to detach the rigid housing and the tank from the at least one launchable communications device to reduce a weight of the at least one launchable communications device during deployment to the airborne operational environment.

10. The method of claim 1, wherein the predetermined operational environment is an airborne operational environment, wherein the deployment equipment comprises airborne propulsion equipment configured to maintain flight of the at least one launchable communications device in the airborne operational environment such that the at least one launchable communications device can act as an unmanned aerial-vehicle (UAV).

11. The method of claim 10, wherein the airborne propulsion equipment comprises rotors that are extended from the at least one launchable communications device by the deployment controller during deployment to the airborne operational environment.

12. The method of claim 10, wherein the deployment controller is configured to detach the rigid housing from the at least one launchable communications device to reduce a weight of the at least one launchable communications device during deployment to the airborne operational environment.

13. The method of claim 1, wherein each of the at least one launchable communications device further comprises a drogue configured to delay descent of the at least one launchable communications device during deployment of deployment equipment to the predetermined operational environment.

14. The method of claim 13, wherein the deployment controller is configured to detach the drogue upon deployment of the deployment equipment of each of the at least one launchable communications device at the predetermined operational environment.

15. The method of claim 1, wherein deploying the at least one launchable communications device comprises deploying a plurality of launchable communications devices via the vehicle to establish one of a point-to-point network and a mesh network between a first communication station and a second communication station.

16. A launchable communications device comprising:
- deployment equipment configured to deploy the launchable communications device and to sustain a deployment state of the launchable communications device to an operational environment;
- an electronic payload comprising a deployment controller to control the deployment equipment and a communications system configured to receive a first communications signal and to transmit a second communications signal; and
- a rigid housing configured to substantially enclose the communications system and deployment equipment prior to and during at least a portion of deployment, the rigid housing having a substantially tubular shape and being dimensioned to facilitate being launched from a vehicle-mounted device launcher via a compressed air launch mechanism.

17. The method of claim 16, wherein the launchable communications device is dimensioned to facilitate being launched from an aircraft-mounted tube launcher.

\* \* \* \* \*